United States Patent
Riznychenko

(10) Patent No.: US 12,148,540 B2
(45) Date of Patent: Nov. 19, 2024

(54) TUBE GRID CELL FOR A NUCLEAR FUEL BUNDLE

(71) Applicant: Westinghouse Electric Sweden AB, Västerås (SE)

(72) Inventor: Oleksiy Riznychenko, Västerås (SE)

(73) Assignee: Westinghouse Electric Sweden AB, Västerås (SE)

( * ) Notice: Subject to any disclaimer, the term of this patent is extended or adjusted under 35 U.S.C. 154(b) by 242 days.

(21) Appl. No.: 17/776,107

(22) PCT Filed: Oct. 21, 2020

(86) PCT No.: PCT/EP2020/079590
§ 371 (c)(1),
(2) Date: May 11, 2022

(87) PCT Pub. No.: WO2021/094066
PCT Pub. Date: May 20, 2021

(65) Prior Publication Data
US 2022/0392652 A1 Dec. 8, 2022

(30) Foreign Application Priority Data
Nov. 13, 2019 (EP) .................................. 19208774

(51) Int. Cl.
*G21C 3/344* (2006.01)
*G21C 3/356* (2006.01)
*G21C 3/334* (2006.01)

(52) U.S. Cl.
CPC ............ *G21C 3/344* (2013.01); *G21C 3/356* (2013.01); *G21C 3/334* (2013.01)

(58) Field of Classification Search
CPC ......... G21C 3/344; G21C 3/356; G21C 3/334
(Continued)

(56) References Cited

U.S. PATENT DOCUMENTS

| | | |
|---|---|---|
| 3,664,924 A | 5/1972 | Krawiec |
| 3,801,452 A | 4/1974 | Milburn |

(Continued)

FOREIGN PATENT DOCUMENTS

| | | |
|---|---|---|
| EP | 0769784 A1 | 4/1997 |
| JP | 1987038392 A | 2/1987 |

(Continued)

OTHER PUBLICATIONS

International Search Report issued in corresponding PCT Application No. PCT/EP2020/079590, dated mailed Jan. 26, 2021, pp. 1-2.

*Primary Examiner* — Jack W Keith
*Assistant Examiner* — Daniel Wasil
(74) *Attorney, Agent, or Firm* — Robinson & Cole LLP

(57) ABSTRACT

A tube grid cell (2) for a fuel bundle (8) of a nuclear reactor. The tube grid cell (2) having the length (L), comprises a cell housing (10) which has, along the longitudinal axis A, a lower section (16), an upper section (18) and a middle section (20). The middle section (20) is provided with two pairs of support members (22) and a resilient member (24) configured to generate a resilient force in an inward radial direction, the resilient member is arranged at essentially equal distance from the support members (22), and positioned approximately (120) degrees apart from the support members seen along axis A. The upper section (18) and the lower section (16) have respectively a length L1 and L2 along axis A that is larger than 0.1 L and smaller than 0.3 L, and is provided with a solid housing wall, having an even thickness and no openings, indentations or protrusions.

11 Claims, 2 Drawing Sheets

(58) Field of Classification Search
USPC .......................................................... 376/442
See application file for complete search history.

(56) References Cited

U.S. PATENT DOCUMENTS

| | | | | |
|---|---|---|---|---|
| 4,137,125 A | * | 1/1979 | Walters | G21C 3/3563 |
| | | | | 376/442 |
| 4,556,531 A | * | 12/1985 | Curulla | G21C 3/344 |
| | | | | 376/442 |
| 4,587,704 A | | 5/1986 | Matzner et al. | |
| 5,069,864 A | | 12/1991 | Johansson | |
| 5,263,071 A | | 11/1993 | Farkas et al. | |
| 5,331,679 A | | 7/1994 | Hirukawa | |
| 5,361,288 A | | 11/1994 | Johansson | |
| 5,371,768 A | | 12/1994 | Matzner | |
| 6,310,932 B1 | * | 10/2001 | Evans | G21C 3/3563 |
| | | | | 376/442 |
| 2006/0104403 A1 | * | 5/2006 | Evans | G21C 3/352 |
| | | | | 376/438 |
| 2011/0080988 A1 | | 4/2011 | Aktas | |

FOREIGN PATENT DOCUMENTS

| | | |
|---|---|---|
| JP | 401212394 A | 8/1989 |
| JP | 1990221891 A | 9/1990 |

* cited by examiner

TUBE GRID CELL FOR A NUCLEAR FUEL BUNDLE

CROSS REFERENCE TO RELATED APPLICATIONS

The instant application is a U.S. National Stage application of and claims priority to PCT/EP2020/079590, filed on Oct. 21, 2020, which is a PCT application of and claims priority to EP Application No. 19208774.0, now EP 3 822 988 A1, filed on Nov. 13, 2019, the subject matter of both aforementioned applications are hereby incorporated by reference in their entireties.

TECHNICAL FIELD

The present disclosure relates to a tube grid cell to be arranged in a grid assembly. The grid assembly is intended for a nuclear fuel bundle for a nuclear reactor, more particularly a boiling water reactor or a pressurized-water reactor.

BACKGROUND

Fuel bundles for boiling water reactors and pressurized-water reactors are known. They include a plurality of upstanding parallel fuel rods positioned and supported by grid assemblies along their length. In operation, coolant flows into the fuel bundle through the lower fuel bundle structural element upward of the fuel bundle and exits the fuel bundle from the upper structural element.

The fuel rods are long, slender, and flexible. Under coolant dynamics these rods would undergo vibration and come into abrading contact one with another. Consequently, so-called spacer grid assemblies (herein denoted tube grid assemblies) are utilized to maintain the fuel rods in their designed side-by-side relation interior along the fuel bundle.

Grid cells with fuel rod support features are currently used in different nuclear fuel designs have non-circle cross section and formed by straps with stamped spring and dimples or from tubes with formed fuel rod support features and known as "ferrule design". One example of this so-called "ferrule design" is disclosed in U.S. Pat. No. 5,371,768.

The ferrules in ferrule spacers constitute discrete cylinders having typically paired stops on one side of the ferrules and fuel rod biasing springs on the other side of the ferrules. The inside diameter of the ferrules exceeds the outside diameter of the fuel rods so that the fuel rod when biased by the spring is centered with respect to the ferrule. When the ferrules are held together in a matrix, a rigid and highly satisfactory spacing of the fuel rods results.

Another related document is EP-0769784 that discloses a spacer for a nuclear fuel bundle for a light-water nuclear reactor, more particularly a boiling water reactor or a pressurized-water reactor, and a nuclear fuel bundle comprising spacers. The fuel bundle comprises a bundle of elongated elements which are retained and fixed by a number of spacers arranged in spaced relationship to each other along the bundle. The spacers comprise a number of cells for mutually fixing the elongated elements. A coolant is adapted to flow from below and up through the normally vertically arranged fuel bundle and, during a nuclear reaction, to cool the elongated elements arranged in the assembly.

Still another document is US-2011/0080988 disclosing fuel bundle designs using mixed spacer types.

U.S. Pat. No. 5,263,071 describes a spacer in the form of a tubular sleeve having fixed supports and spring means. There are four supports, two of which are arranged at an upper plane and two at a lower plane, which together with the leaf spring midway between the support pairs forms five points of contact with the fuel rod. The sleeves can be arranged in a grid to form a spacer.

U.S. Pat. No. 5,331,679 describes tubular ferrules used as fuel spacers. The arrangement consists of two pairs of projections at the top and bottom of the ferrule. Between the projections is a loop spring placed in a cut-out, such that the fuel rods will have a five point contact. The ferrules can be spot welded to each other in order to form a spacer. The weld spots are located at the top and bottom of the ferrule.

U.S. Pat. No. 5,069,864 describes a spacer consisting of ferrules having two upper stops and two lower stops extending inwardly into the ferrule and a spring inserted into a slot. The spring is a separate component and is not integral with the ferrule wall.

U.S. Pat. No. 3,801,452 describes a spacer grid consisting of tubular ferrules. The individual ferrules have two pairs of support members and a bow spring for providing a five point contact with the fuel rod.

U.S. Pat. No. 3,664,924 shows an alternative arrangement for achieving five points of contact, in which a spacer grid has four arches and one spring member contacting each fuel rod.

JP H01 212394 discloses a round cell for supporting a water rod is composed of a cylindrical member and a U-shaped notch for mounting plate spring for holding a fuel rod.

U.S. Pat. No. 5,361,288 relates to a spacer with integral Zircaloy springs to be applied in a nuclear fuel bundle for boiling water nuclear reactors.

Although many of the known tube grid cells and grid assemblies meet high quality standards there is still room for improvements with regard to achieve better lateral properties than existing designs, while offering improved cell stiffness and low hydraulic resistance. Thus, the object of the tube grid cell and the grid assembly according to the present invention is to achieve an improved tube grid cell and grid assembly having better lateral properties than existing design, having improved grid assembly stiffness and low hydraulic resistance.

SUMMARY

The above object is achieved by a tube grid cell and a grid assembly according to the independent claims.

Preferred embodiments are set forth in the dependent claims.

The proposed solution gives better lateral properties than existing designs, offering improved cell stiffness and low hydraulic resistance.

According to the present invention the tube grid cell is provided with a circle cross section with one "leaf" spring and two pairs of horizontal support members positioned 120 degrees apart and located above and below the spring providing a five point contact system to support the fuel rod. The tube grid cells in a grid assembly are welded on upper and lower sections of the cell housing to form a grid with triangular or square pitch between fuel rods.

The two solid upper and lower sections above upper support members and below lower support members provide a rigid contact area between adjacent cells that in conjunction with entire tube cell geometry minimizes impact on a single cell fuel rod support features due to potential lateral impact force. This is one of benefits of the proposed tube cell that improves the grid assembly lateral properties in comparison with the existing designs.

Another advantage of the cell design is a leaf spring and horizontal dimples that provide a stable five contact point fuel rod support system with improved cell stiffness characteristics. Furthermore, the grid made from the tube cells has minimized blockage that reduces grid hydraulic resistance and improves fuel thermal hydraulic characteristics.

Thus, the tube grid cell and the grid assembly presented herein will achieve the following:

The tube grid cell has a geometry that minimizes impact on a single cell fuel rod support features due to potential lateral impact force. Thereby the lateral properties of the grid assembly and ability to maintain lateral spacing between fuel rod under a lateral impact are improved in comparison with existing designs.

Improved stiffness characteristics of the cell is achieved by the cell design of comprising a leaf spring and horizontal dimples to provide a five contact point fuel rod support system.

The design of the grid assembly has a minimized blockage that reduces grid hydraulic resistance and improves fuel thermal hydraulic characteristics. This is partly because of the open structure of the support members.

DETAILED DESCRIPTION

The tube grid cell, and also the grid assembly and fuel bundle, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
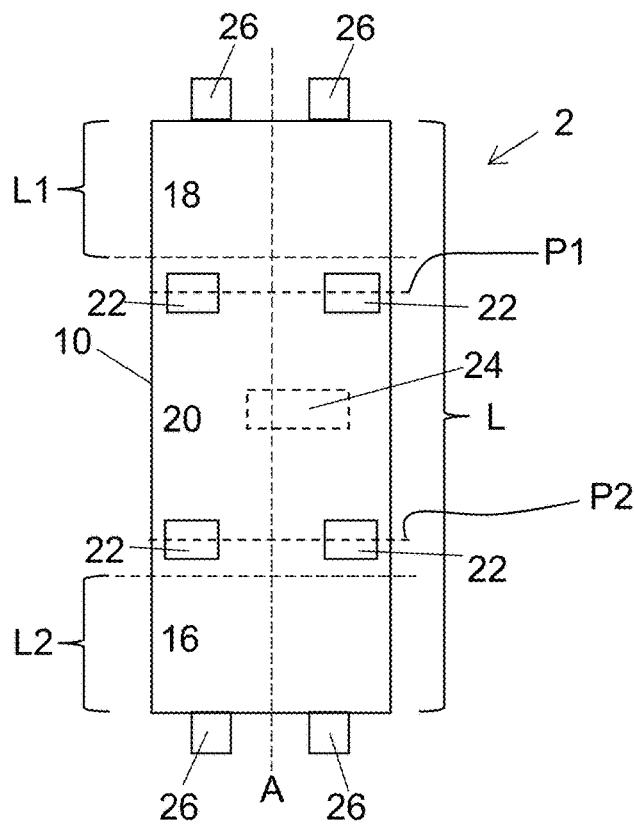
FIG. 1 is a side view schematically illustrating a cell according to an embodiment of the present invention.
Figure 2:
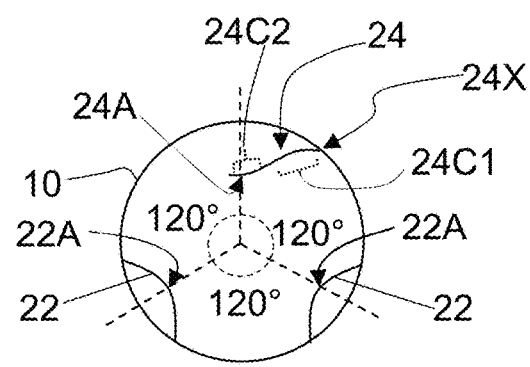
FIG. 2 is a view along axis A in FIG. 1 schematically illustrating a cell according to an embodiment of the present invention.

With references to FIGS. 1 and 2 the tube grid cell 2 (also referred to herein as the cell) will now be described in detail. The tube grid cell 2 is structured to be mounted in a grid assembly 4 (see FIGS. 4-5) including a plurality of tube grid cells and intended to hold a plurality of elongated fuel rods 6 in a fuel rod bundle 8 (see FIG. 6) in a nuclear reactor. The tube grid cell 2 is cylinder-shaped, has an essentially circular cross-section and an elongated extension along a longitudinal axis A, and has a length L, and that axis A has an essentially vertical direction during normal use.

Figure 3A:
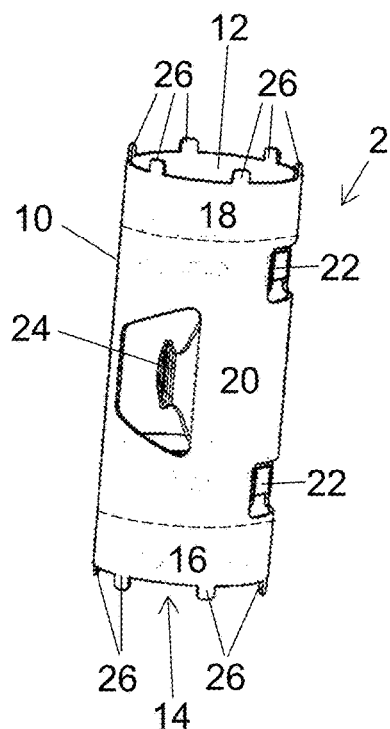
FIGS. 3A and 3B shows two perspective views of a cell according to an embodiment of the present invention.
Figure 3B:
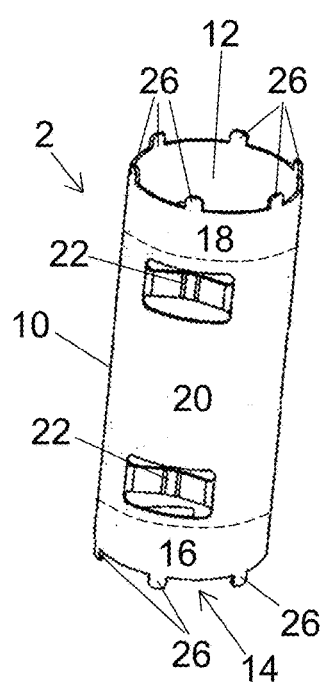
Figure 4:
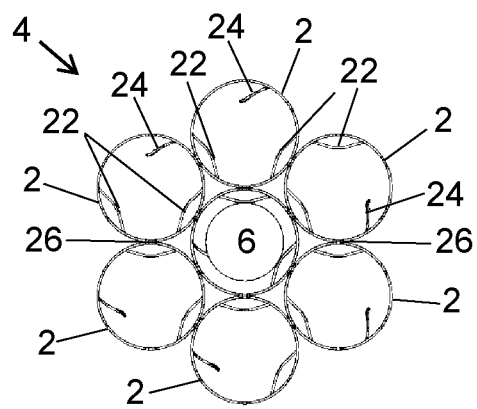
FIG. 4 is a view from above of a tube grid assembly according to one embodiment with a triangular pitch between rods of the present invention.

The tube grid cell comprises a cell housing 10 defining a top opening 12 and a bottom opening 14 (see FIG. 3) configured to receive a fuel rod 6 (see FIG. 4).

The cell housing 10 comprises, along the longitudinal axis A, a lower section 16, an upper section 18 and a middle section 20 placed between the upper and lower sections. The lower and upper sections may be symmetrically arranged with regard to the middle section as presented on FIG. 3.

The middle section 20 is provided with two pairs of support members 22 each having a radially inward directed extension, one of said pairs is arranged close to an upper part of the middle section 20, and the other of said pairs is arranged close to a lower part of the middle section 20.

The support members 22 of each pair are arranged at a same plane being perpendicular to axis A and are positioned approximately 120 degrees apart from each other, and the support members 22 of one pair are arranged above and vertically aligned with the support members 22 of the other pair.

The middle section 20 is also provided with a resilient member 24 configured to generate a resilient force in an inward radial direction to support a fuel rod. The resilient member is arranged between (e.g., entirely vertically between) said planes P1, P2 of the pairs of support members and at essentially equal distance from the planes of the support members 22. The resilient member 24 is positioned approximately 120 degrees apart from the support members seen along axis A. The resilient member may have shape of a leaf spring attached to the housing wall and displaying an arcuate shape inwards. As shown in FIG. 2, the the resilient member 24 has an inwardly facing concave section 24C1 that extends integrally from a portion 24X of the cell housing 10, transitions to an outwardly facing concave section 24C2 which terminates at a distal end of the resilient member 24. The resilient member 24 has a resilient-member-apex 24A that is on an innermost facing portion of the resilient member 24 opposite the outwardly facing concave section 24C2. The middle section has: (a) a first upper support member 22 that has a first radially inward directed upper extension which has a first upper support-member-apex 22A that is on an innermost facing portion of the first radially inward directed upper extension; (b) a second upper support member 22 that has a second radially inward directed upper extension which has a second upper support-member-apex 22A that is on an innermost facing portion of the second radially inward directed upper extension; (c) a first lower support member 22 that has a first radially inward directed lower extension which has a first lower support-member-apex 22A that is on an innermost facing portion of the first radially inward directed lower extension; (d) a second lower support member 22 that has a second radially inward directed lower extension which has a second lower support-member-apex 22A that is on an innermost facing portion of the second radially inward directed lower extension. The first upper support member 22 and the second upper support member 22 are arranged on a first plane Pl perpendicular to the longitudinal axis and are arranged proximate to an upper part of the middle section. The first lower support member 22 and the second lower support member 22 are arranged on a second plane P2 perpendicular to the longitudinal axis and are arranged proximate to lower part of the middle section. The first upper support-member-apex 22A and the second upper support-member-apex 22A are positioned approximately 120 degrees apart from one another. The first lower support-member-apex 22A and the second lower support-member-apex 22A are positioned approximately 120 degrees apart from one another. The first upper support member 22 is arranged above and vertically aligned with the first lower support member 22. The second upper support member 22 is arranged above and vertically aligned with the second lower support member 22. The resilient-member-apex is positioned approximately 120 degrees apart from the first upper support-member-apex, the second upper support-member-apex, the first lower support-member-apex and the second lower support-member-apex. The upper section has a first total length L1 measured parallel to the longitudinal axis A and extending downwardly from the top opening and the lower section has a second total length L2 measured parallel to the longitudinal axis A and extending upwardly from the bottom opening. The first total length L1 is greater than 0.1 times the overall length L, the second total length L2 is greater than 0.1 times the overall length L, the first total length L1 is less than 0.3 times the overall length L and the second total length L2 is less than 0.3 times the overall length. The upper section and the lower section each are circumferentially continuous and have a solid housing wall and a uniform thickness. The upper section and the lower section are configured for lateral stiffness and rigid contact with adjacent cells. When a fuel rod 6 is inserted in the grid cell, see the mid cell of FIG. 4, the resilient member 24 is structured to urge the fuel rod inwards in a radial direction against the support members 22.

The upper section 18 and the lower section 16 have respectively length L1 and L2 along axis A that is larger than 0.1 L and smaller than 0.3 L, i.e. 0.1 L<L1(L2)<0.3 L. In one embodiment L1 and L2 are equal. Furthermore, the upper and lower sections are provided with a solid housing wall, having an even thickness and no openings, indentations, or protrusions.

The solid housing walls of the upper and lower sections will improve lateral properties of the grid assembly which is made up of a plurality of tube grid cells welded together. The welding is performed at the upper and lower sections, e.g. by laser welding.

According to one embodiment, each of the upper 18 and lower sections 16 is provided with a predetermined number of welding members 26 structured for welding when attaching neighbouring grid cells to each other. Preferably, each welding member is a protrusion extending from the housing wall along axis A.

Preferably, the tube grid cell 2 comprises four or six welding members.

Figure 5:
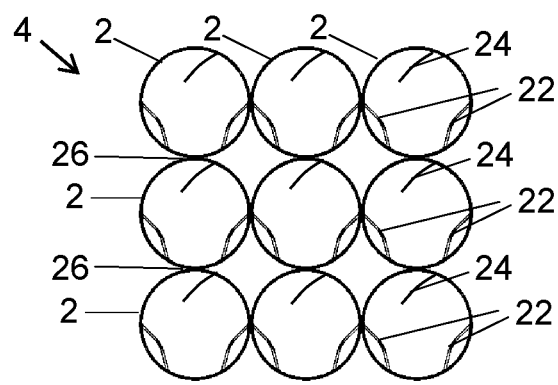
FIG. 5 is a view from above of a tube grid assembly according to another embodiment with a square lattice arrangement of the present invention.

If four welding members 26 are provided at each upper 18 and lower 16 sections, the tube grid cells advantageously are arranged in the grid assembly as illustrated in FIG. 5, in a square lattice.

If instead six welding members 26 are provided at each upper 18 and lower 16 sections, the tube grid cells advantageously are arranged in the grid assembly as illustrated in FIG. 4, in a triangular array.

Note that in FIGS. 4 and 5 only a minor part of a grid assembly are shown.

According to an embodiment the support members 22 are provided with an open structure in the longitudinal direction along axis A allowing coolant to easy pass by. Preferably, the support member has a bow-like shape in a plane perpendicular to axis A, and is attached at each of its ends to an inner surface of the housing wall.

According to still another embodiment, the tubular housing wall of the middle section is provided with openings at positions where the support members and the resilient member are arranged (see e.g. FIG. 3).

The present invention also relates to a grid assembly 4 comprising a plurality of tube grid cells 2 as defined above. The plurality of tube grid cells are advantageously arranged in a triangular array (see FIG. 4) or in a square lattice (see FIG. 5).

Figure 6:
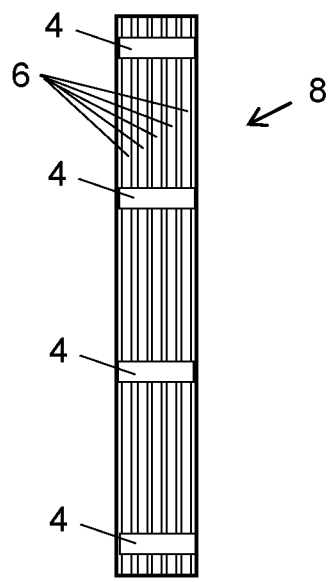
FIG. 6 shows a schematic illustration of a fuel rod bundle provided with grid assemblies according to the present invention.

Furthermore, the present invention relates to a fuel bundle assembly 8 comprising at least two grid assemblies 4 arranged to firmly hold a bundle of fuel rods 6. An exemplary fuel bundle 8 is schematically illustrated in FIG. 6 that comprises four grid assemblies.

The present invention is not limited to the above-described preferred embodiments. Various alternatives, modifications and equivalents may be used. Therefore, the above embodiments should not be taken as limiting the scope of the invention, which is defined by the appending claims.

What is claimed is:

1. A cell for a grid assembly in a nuclear fuel bundle;
the cell being cylinder-shaped, having an essentially circular cross-section and an elongated extension along a longitudinal axis, and has an overall length measured parallel to the longitudinal axis, and the longitudinal axis has an essentially vertical direction during normal use;
the cell comprises a cell housing comprising a tubular housing wall defining a top opening and a bottom opening configured to receive a fuel rod, the overall length extending from the top opening to the bottom opening,
the cell housing comprises a lower section, an upper section and a middle section placed between the upper and lower sections, the lower section, the middle section, and the upper section being aligned along the longitudinal axis;
the middle section comprising:
(a) a first upper support member having a first radially inward directed upper extension which has a first upper support-member-apex that is on an innermost facing portion of the first radially inward directed upper extension;
(b) a second upper support member having a second radially inward directed upper extension which has a second upper support-member-apex that is on an innermost facing portion of the second radially inward directed upper extension;
(c) a first lower support member having a first radially inward directed lower extension which has a first lower support-member-apex that is on an innermost facing portion of the first radially inward directed lower extension;
(d) a second lower support member having a second radially inward directed lower extension which has a second lower support-member-apex that is on an innermost facing portion of the second radially inward directed lower extension; and
the first upper support member and the second upper support member being arranged on a first plane perpendicular to the longitudinal axis and being arranged proximate to an upper part of the middle section;
the first lower support member and the second lower support member being arranged on a second plane perpendicular to the longitudinal axis and being arranged proximate to lower part of the middle section;
the first upper support-member-apex and the second upper support-member-apex are positioned approximately 120 degrees apart from one another;
the first lower support-member-apex and the second lower support-member-apex are positioned approximately 120 degrees apart from one another;
the first upper support member is arranged above and vertically aligned with the first lower support member;

the second upper support member is arranged above and vertically aligned with the second lower support member;

the middle section further comprising a circumferentially extending resilient member that extends integrally from the cell housing, the resilient member being configured to generate a resilient force in an inward radial direction, the resilient member is arranged entirely between and essentially equidistant from the first plane and the second plane, the resilient member having a resilient-member-apex that is on an innermost facing portion of the resilient member and the resilient-member-apex is positioned approximately 120 degrees apart from the first upper support-member-apex, the second upper support-member-apex, the first lower support-member-apex and the second lower support-member-apex, wherein the upper section has a first total length measured parallel to the longitudinal axis and extending downwardly from the top opening and the lower section has a second total length measured parallel to the longitudinal axis and extending upwardly from the bottom opening, the first total length being greater than 0.1 times the overall length, the second total length being greater than 0.1 times the overall length, the first total length being less than 0.3 times the overall length and the second total length being less than 0.3 times the overall length;

wherein the upper section and the lower section each are circumferentially continuous and have a solid housing wall and, a uniform thickness, the upper section and the lower section being configured for lateral stiffness and rigid contact with adjacent cells.

2. The cell according to claim 1, wherein each of the upper and lower sections is provided with a predetermined number of welding members located at circumferential spaced locations on an exterior surface of the cell housing and being structured for welding and configured for attaching neighbouring grid cells to each other.

3. The cell according to claim 2, wherein each of the welding members is a protrusion extending from the tubular housing wall parallel to the longitudinal axis.

4. The cell according to claim 2, comprising four or six welding members.

5. The cell according to claim 1, wherein each of said support members has a bow-like shape in a plane perpendicular to the longitudinal axis and extending from a support member first end to a support member second end each of which is attached to an inner surface of the tubular housing wall.

6. The cell according to claim 1, wherein the tubular housing wall of the middle section is provided with openings extending through the tubular housing wall at positions where the support members and the resilient member are arranged.

7. The cell according to claim 1, wherein the resilient member has an inwardly facing concave section that extends integrally from the cell housing and transitions to an outwardly facing concave section which terminates at a distal end of the resilient member.

8. The cell according to claim 1, wherein the resilient member is located entirely vertically between the first upper support member and the first lower support member, is located entirely vertically between the second upper support member and the second lower support member, and is vertically spaced apart from the first upper support member, the first lower support member, second upper support member, and the second lower support member.

9. A grid assembly comprising a plurality of cells according to claim 1.

10. A nuclear fuel bundle comprising at least two grid assemblies according to claim 9.

11. A nuclear reactor comprising at least one nuclear fuel bundle according to claim 10.

* * * * *